United States Patent [19]

Park

[11] Patent Number: 5,500,877

[45] Date of Patent: Mar. 19, 1996

[54] RECEIVER FOR A SUPERPOSE MODULATED SIGNAL

[75] Inventor: Il-keun Park, Suwon, Rep. of Korea

[73] Assignee: Samsung Electronics Co., Ltd., Kyungki, Rep. of Korea

[21] Appl. No.: 112,032

[22] Filed: Aug. 26, 1993

[51] Int. Cl.[6] .............................. H03D 1/00; H04L 27/14
[52] U.S. Cl. ........................ 375/343; 375/340; 375/324
[58] Field of Search ................................... 375/336, 340, 375/343, 332, 324, 326, 344, 345; 325/35 J

[56] References Cited

U.S. PATENT DOCUMENTS

| | | | |
|---|---|---|---|
| 4,305,150 | 12/1981 | Richmond et al. | 371/6 |
| 4,339,724 | 7/1982 | Feher | 327/129 |
| 4,644,565 | 2/1987 | Seo et al. | 375/296 |
| 5,151,926 | 9/1992 | Chennakeshu et al. | 375/333 |
| 5,283,815 | 2/1994 | Chennakeshu et al. | 375/330 |
| 5,311,544 | 5/1994 | Park et al. | 375/206 |
| 5,313,494 | 5/1994 | Park | 375/295 |

Primary Examiner—Young T. Tse
Assistant Examiner—William Luther
Attorney, Agent, or Firm—Lowe, Price, LeBlanc & Becker

[57] ABSTRACT

A receiver of a superpose modulated signal comprises: a symbol timing recovery circuit for receiving the superpose modulated signal and producing a symbol timing signal, the period of the symbol timing signal being the same as the period of the superpose modulated signal; a correlation signal generator for receiving the symbol timing signal and generating a correlation signal as $$B + (P - B)\cos\left(2\pi \frac{t}{T}\right)$$

or $$B - (P - B)\cos\left(2\pi \frac{t}{T}\right)$$

wherein B is an adjustable parameter, P is a predetermined maximum value and T refers to the symbol duration; a correlation multiplier for multiplying the superpose modulated signal by the correlation signal; and an integrator for integrating the output of the correlation multiplier for every symbol period.

13 Claims, 11 Drawing Sheets

RECEIVER FOR A SUPERPOSE MODULATED SIGNAL

BACKGROUND OF THE INVENTION

This invention relates to a receiver for a digital transmission system, and more particularly to a receiver for a superpose modulated signal for use in digital transmission systems. That is, the transmitted signal is a superpose modulated signal.

Binary data signals are usually modulated onto a single carrier or onto quadrature carrier signals for transmission to a receiver. The last stage prior to transmission is usually high-powered amplification. Efficient high-powered amplifier operation requires that the amplifier be operated in its saturation mode, which results in non-linearity of the output. Therefore, employing a high-powered amplifier results in the creation of numerous sidebands, which usually causes inter-channel interference. Accordingly, modulation methods are required which are capable of solving this problem, with the efficient use of power and bandwidth in transmission.

Modulation methods satisfying with above requirement are disclosed in U.S. Pat. No. 4,399,724 by Kamilo Feher and U.S. Pat. No. 4,644,565 by Jong-soo Seo and Kamilo Feher. In both of these patents, a bit in pulse form (such as non-return-to-zero) is transformed into output signal which corresponds one of four specified signals based on the previous bit and the present bit to be transmitted. In the former patent, the four specified signals are $A\cos(\pi t/T)$, $-A$, $-A\cos(\pi t/T)$ and $A$, where $A$ is an amplitude parameter and $T$ is the bit duration. Meanwhile, in the latter patent, the four specified signals are $-A-(1-A)\cos(2\pi t/T)$, $-\cos(\pi t/T)$, $\cos(\pi t/T)$ and $A+(1-A)\cos(2\pi t/T)$, where likewise $A$ is an amplitude parameter and $T$ is the bit duration. These modulated signals have continuity even at the bit transition position and have no jitter and no inter-symbol interference. More particularly, the latter modulation method is able to control the bandwidth of the transmitted signal to suit the transmission system, by use of the amplitude parameter $A$. The signal thus-modulated is called a superpose modulated signal.

Hereinafter, conventional receivers for demodulating the superpose modulated signal which may include noise, will be explained.

Among conventional receivers, there are a matched filter receiver and optimum receiver. The matched filter receiver includes a filter whose transfer characteristic matches that of another filter in the transmitter, resulting in reducing the noise signal and maximizing the original signal in the received signal. The transmitted signals, however, have very complicated components as described above, thereby the implementation of the matched filter receiver being difficult. Accordingly, a physical filter receiver can be used instead of the matched filter receiver. The physical filter receiver is, for example, a Butterworth filter having a 3 dB frequency (or half-power point) which is the half the bit frequency.

In the convention physical filter, however, changing the bit rate of the transmitter changes its half-power frequency (3 dB point). Here, determining the half-power frequency of the physical filter in the receiver is critical, because an improperly set half-power point results in the degradation of the bit energy-to-noise density ratio and/or attenuating the original signal components, thereby increasing the error rate. For improvement of this problem, a filter is disclosed in which one of a plurality of half-power frequencies is selected at any given time and in accordance with the bit rate of the transmitter. However, this filter requires an excessive amount of hardware whose implementation increases costs accordingly. The conventional physical filter must also change its characteristics in accordance with an amplitude parameter or superposed parameter $A$.

Therefore, in a conventional transmission system, the receiver's filter itself is generally changed, according to the bit rate of the transmitter.

Another conventional receiver, the optimum receiver, can reduce the error rate in demodulation. In the optimum receiver, correlation pulses are generated which correspond to the baseband signals of the transmitter, and then the received signal is compared with the correlation pulses for demodulation. The optimum receiver can also change its transfer characteristic by adjusting the periods of the correlation pulses, in the case of a changed bit rate in the transmitter, for matching itself with the transmitter.

Here, the superpose modulated signal includes a plurality of baseband signals, so that the implementation of the optimum receiver related to a superpose modulate signal requires a plurality of generators for respectively generating baseband signals and a plurality of detectors for respectively producing observation signals. The optimum receiver must also include a selector for selecting one of the observation signals. Therefore, the implementation an optimum receiver is complex.

For reducing such complexity, a sub-optimum receiver is disclosed, which is constituted based on fewer baseband signals than those of the optimum receiver, thereby simplifying its structure though increasing the probability of error. For example, the optimum receiver for minimum shift keying (MSK) can be used for demodulating the superpose quadrature modulated signal as a sub-optimum receiver. Here, the MSK optimum receiver produces a plurality of correlation pulses with respect to each MSK baseband signal, and the baseband signals for MSK are similar to those for a superpose quadrature modulated signal. In more detail, the smaller the amplitude parameter $A$ is, the greater the similarity between the baseband signals for superpose quadrature modulated signal and those for MSK is, so as to reduce the mismatching degree between transmitter and receiver. That is to say, the demodulation for a superpose quadrature modulated signal with MSK optimum receiver may be performed with a negligible amount of degradation in the probability of error. Here, the smaller the amplitude parameter $A$ is, the smaller the probability of error is. However, the occupied bandwidth of the superpose quadrature modulated signal increases according to the reduction of the amplitude parameter $A$, based on the characteristics of the superpose quadrature modulated signal, thereby decreasing bandwidth efficiency. Here, it should be noted that occupied bandwidth for MSK is wider than that for a superpose quadrature modulated signal within the amplitude parameter ($0.5 \leq A \leq 1.0$) and that MSK has side lobes which are appreciable. Accordingly, the sub-optimum receiver for superpose quadrature modulated signals, which is constituted based on the baseband signals for MSK, has transfer characteristics consistent with that of an MSK transmitter. Therefore, the occupied bandwidth of the sub-optimum receiver is increased according to the MSK-transmitted bandwidth, such that it receives more adjacent channel signals, which increases the probability of error for a multi-channel transmission system.

SUMMARY OF THE INVENTION

Accordingly, the object of this invention is to provide a receiver of superpose modulated signal, which requires less hardware than the conventional optimum receiver while satisfying a given probability of error, and is flexible with respect to the bit rate and amplitude parameter A. The receiver according to this invention also has resistance against adjacent channel interference, for a multi-channel transmission system, thereby lessening the increase in the probability of error.

To achieve the above object of this invention, there is provided with a receiver of superpose modulated signal comprising:

symbol timing recovery means for receiving the superpose modulated signal and extracting timing information therefrom to produce a symbol timing signal with being synchronized;

correlation signal generating means for generating a correlation signal as $B+(P-B)\cos(2\pi t/T)$ based on said symbol timing signal, where B is a parameter to be adjustable, P is a predetermined maximum value and T refers to the symbol duration;

correlation multiplying means for multiplying the superpose modulated signal by said correlation signal; and means for integrating the output of said correlation multiplying means per each symbol period.

To achieve the object of this invention, there is also provided with a receiver of superpose quadrature modulated signal being transmitted on a carrier signal comprising:

means for receiving the transmitted signal and extracting carrier information to produce a in-phase recovery carrier signal with being synchronized;

phase shifting means for phase-shifting on the in-phase recovery carrier signal to produce a quadrature-phase recovery carrier signal;

first carrier multiplying means for multiplying the superpose quadrature modulated signal by the in-phase recovery carrier signal to produce a in-phase superpose modulated recovery signal;

second carrier multiplying means for multiplying the superpose quadrature modulated signal by the quadrature-phase recovery carrier signal to produce a quadrature-phase superpose modulated recovery signal;

symbol timing recovery means for receiving one of said in-phase and quadrature-phase superpose modulated recovery signals and producing a symbol timing signal with being synchronized;

correlation signal generating means for receiving said symbol timing signal and generating a first correlation signal as $B+(P-B)\cos(2\pi t/T)$ and a second correlation signal as $B-(P-B)\cos(2\pi t/T)$, where B is a parameter to be adjustable, P is a predetermined maximum value and T refers to the symbol duration;

first correlation multiplying means for multiplying the in-phase superpose modulated recovery signal by the first correlation signal;

second correlation multiplying means for multiplying the quadrature-phase superpose modulated recovery signal by the second correlation signal;

first integrating means for integrating the output of the first correlation multiplying means per each symbol period; and second integrating means for integrating the output of the second correlation multiplying means per each symbol period.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
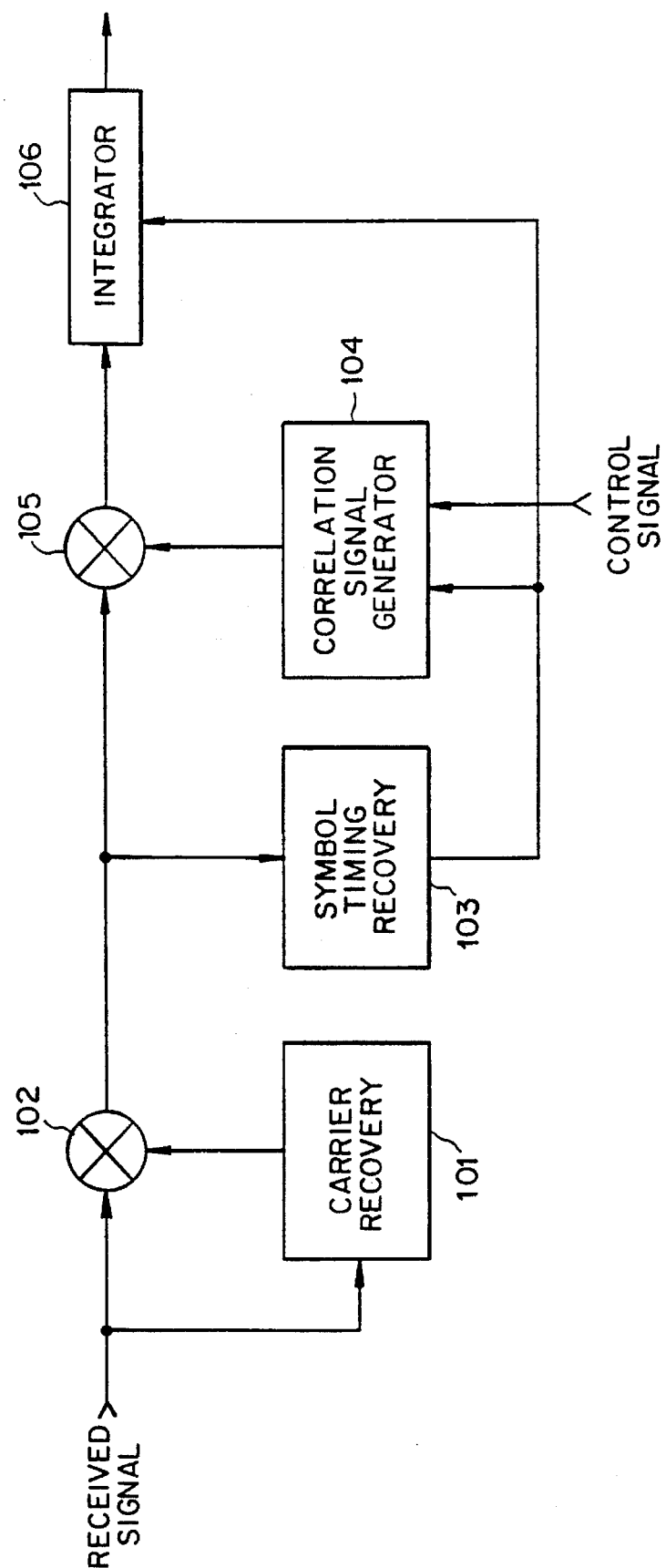
FIG. 1 is a general block diagram of the receiver according to the present invention.

FIG. 1 is a general block diagram of the receiver according to the present invention. The receiver includes a carrier recovery circuit 101, a carrier multiplier 102, a symbol timing recovery circuit 103, a correlation signal generator 104, a correlation multiplier 105 and an integrator 106.

Referring to FIG. 1, a received signal which has been transmitted on a carrier signal is applied to carrier recovery circuit 101. Carrier recovery circuit 101 performs an operation on the received signal to produce a recovery carrier signal that is synchronized with that of corresponding transmitter, and is conventionally constructed. That is to say, carrier recovery circuit 101 detects the high-frequency components of the received signal to produce a recovery carrier signal whose frequency and phase match those of the carrier signal used in the transmitter.

The received signal is also applied to a carrier multiplier 102, wherein it is multiplied by the recovery carrier signal. Here, provided that the received signal has no noise, the output of carrier multiplier 102 is one of the baseband signals of the superpose modulated signal. If not, the output of carrier multiplier 102 includes one of the baseband signals of the superpose modulated signal as well as needless harmonic components. Symbol timing recovery circuit 103 performs an operation on the output of carrier multiplier 102 to produce a symbol timing signal. The symbol timing signal is in sinusoidal form and has a period T. In other words, the symbol timing signal can be represented as $\cos(2\pi t/T)$, where t is a time which varies from "0" to "T." Here, the period T is the same as that of baseband signals included in the received signal.

Correlation signal generator 104 receives the symbol timing signal and a control signal to produce a correlation signal which is denoted as $B+(P-B)\cos(2\pi t/T)$, where B is a parameter to be varied in accordance with the control signal, and P is a predetermined maximum value.

Correlation multiplier 105 receives the output of carrier multiplier 102 and the correlation signal $B+(P-B)\cos(2\pi t/T)$ and then multiplies the former by the latter. Accordingly, in correlation multiplier 105, the output signal energy is maximized, provided that the output of carrier multiplier 102 matches and has the same polarity as the correlation signal $B+(P-B)\cos(2\pi t/T)$. Here, the output signal energy of correlation multiplier 105 is minimized, provided that the output of carrier multiplier 102 matches but has the opposite polarity of the correlation signal $B+(P-B)\cos(2\pi t/T)$.

Integrator 106 integrates the output of correlation multiplier 105 per each symbol period. That is to say, the output of integrator 106 is reset at the initial points of each symbol period. Integrator 106 is also called an "integrate and dump" circuit. The output of integrator 106 may be applied as a decision device to decode original data which corresponds to the data to be modulated by the transmitter.

Figure 2A:
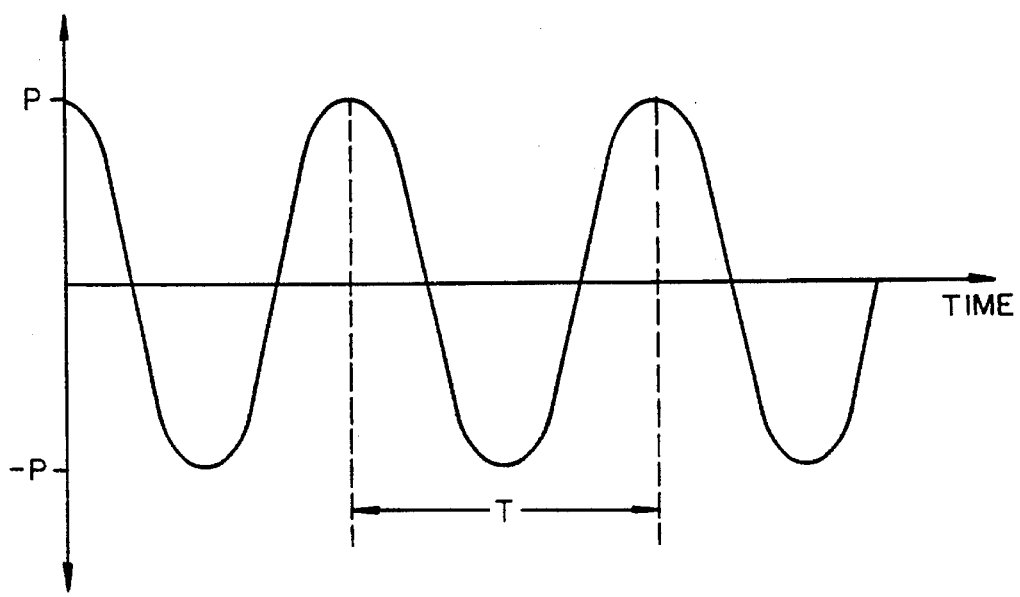
FIGS. 2a, 2b and 2c illustrate waveforms of the correlation signals produced by correlation signal generator 104 in accordance with the parameter [B] and the maximum value [P]
Figure 2B:
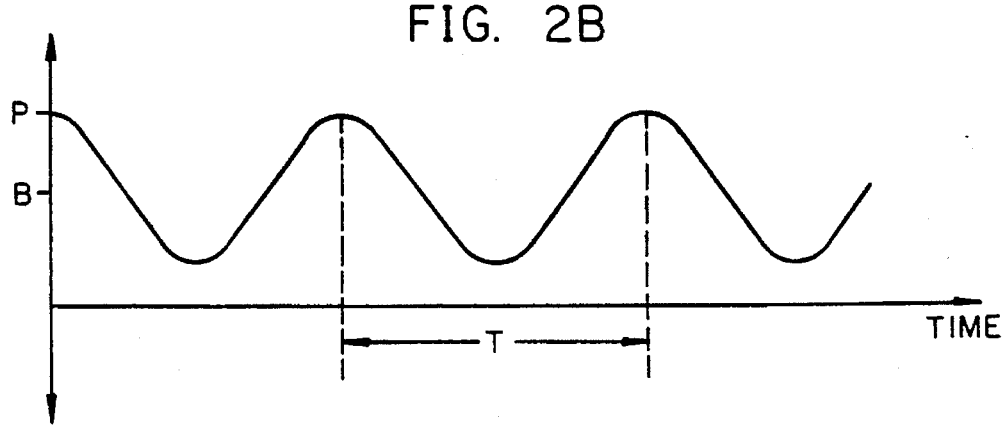
Figure 2C:
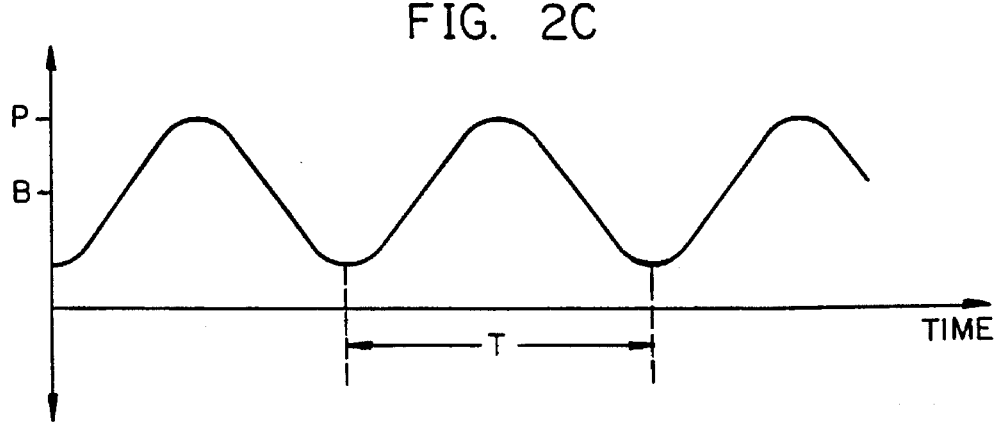

FIGS. 2a, 2b and 2c illustrate waveforms of the correlation signals produced by correlation signal generator 104 in accordance with the parameter [B] and the maximum value [P]. In particular, FIG. 2a illustrates the waveform of the correlation signal, provided that the parameter [B] equals zero, or the correlation signal being denoted as $P\cos(2\pi t/T)$. FIG. 2b illustrates the waveform of a correlation signal which is denoted as $B+(P-B)\cos(2\pi t/T)$. FIG. 2c illustrates the waveform of a correlation signal which is denoted as $B-(P-B)\cos(2\pi t/T)$. The correlation signal $B-(P-B)\cos(2\pi t/T)$ is generated by a correlation signal generator included in the receiver for MSK signals, which will be explained with reference to FIG. 8.

Figure 3A:
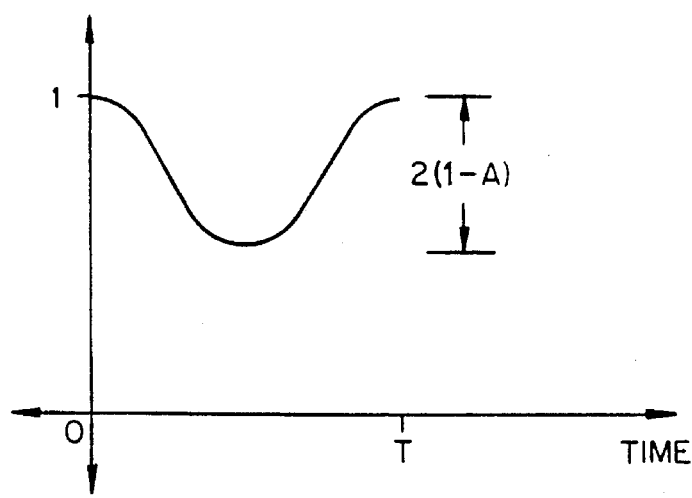
FIGS. 3a–3d are waveforms of the baseband signals included in the superpose modulated signal.
Figure 3B:
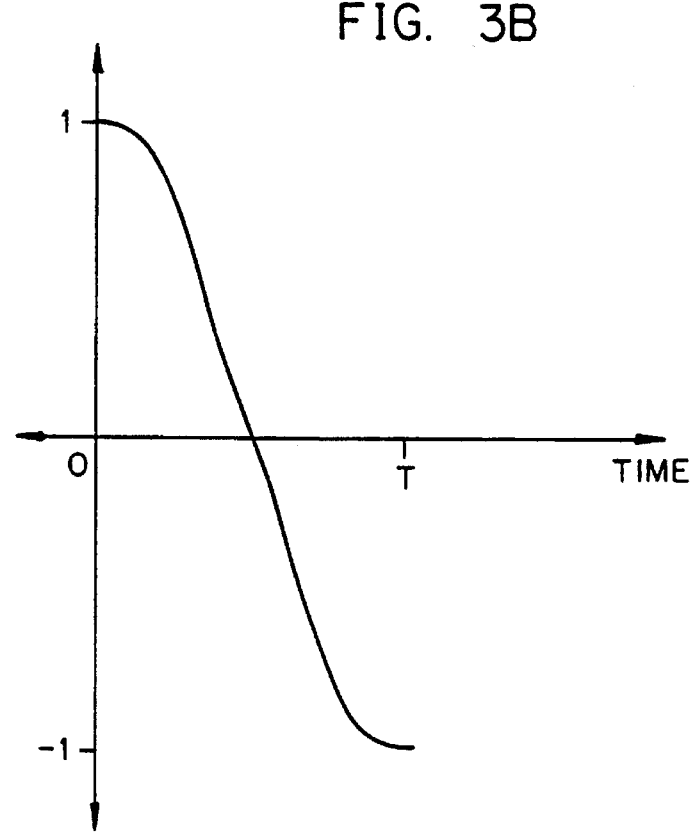
Figure 3C:
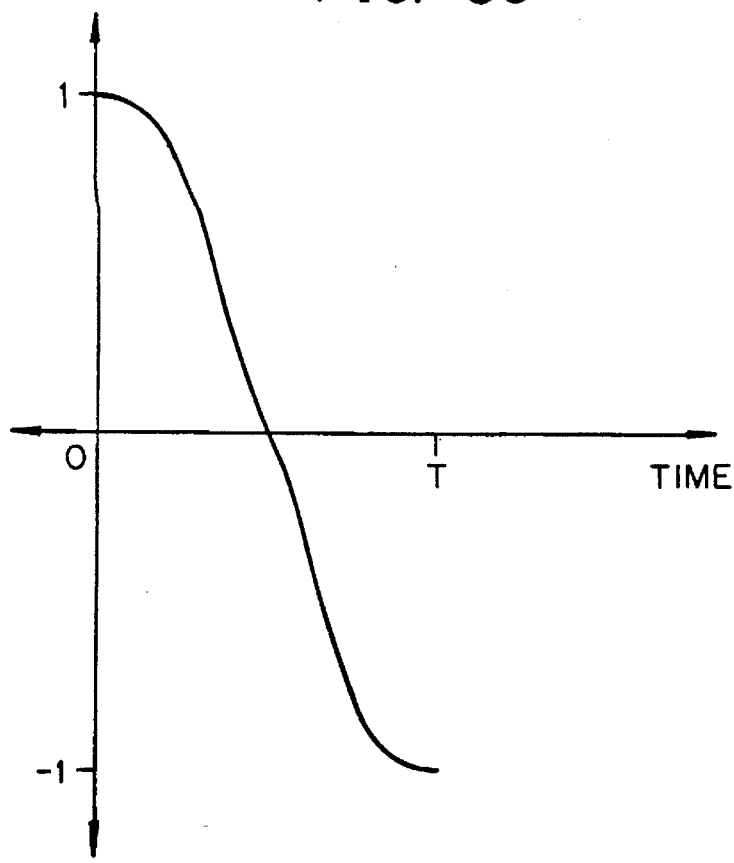
Figure 3D:
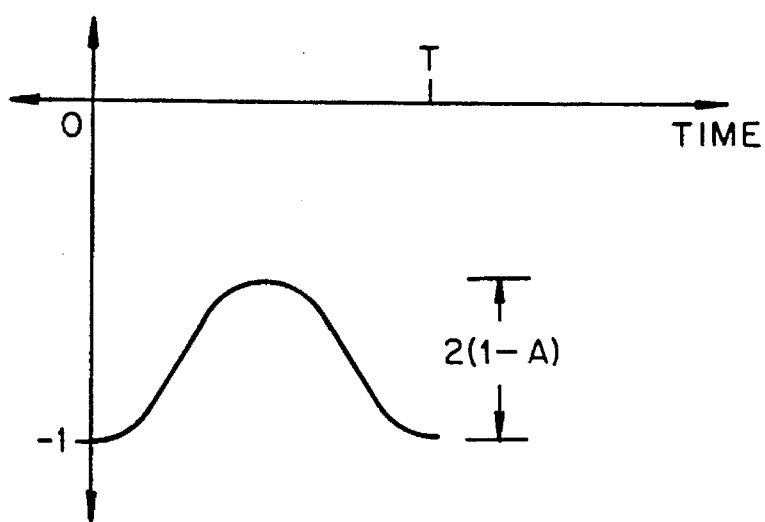

FIGS. 3a–3d are waveforms of the baseband signals or superpose modulated signals. In particular, the superpose modulated signals can be represented as:

| | |
|---|---|
| $A + (1 - A)\cos(2\pi t/T)$ | FIG. 3a |
| $\cos(\pi t/T)$ | FIG. 3b |
| $-\cos(\pi t/T)$ | FIG. 3c |
| $-A - (1 - A)\cos(2\pi t/T)$ | FIG. 3d |

These baseband signals or the superpose modulated signals will be produced by carrier multiplier 102, provided that the received signal has no noise.

Returning to FIGS. 2a, 2b and 2c, the correlation signal does not critically match one of the baseband signals shown in FIGS. 3a–3d, but its amplitude can be controlled by the parameter B, resulting in varying degrees of mismatch (given that all baseband signals are equal).

Also, the receiver has flexibility with regard to the symbol rate or bit rate of the transmitter, resulting from the fact that the period of the correlation signal $B+(P-B)\cos(2\pi t/T)$ follows the period of the symbol timing signal which is same as that of the symbol period at the transmitter. Additionally, the receiver has flexibility with regard to the amplitude parameter A of the transmitter, resulting from the fact that the correlation signal $B+(P-B)\cos(2\pi t/T)$ can be changed by controlling the parameter B for reducing the degree of mismatch between baseband signals.

By integrating the output of correlation multiplier 105 over one symbol period via integrator 106, the needless harmonic components included in the output of carrier multiplier 102 are eliminated, and the original signal energy is reproduced. Here, the output of integrator 106 is more than "0," resulting in the received information being decoded as "1," whereas if the output of integrator 106 is less than "0," results in the received information being decoded as "0." Also, the output of integrator 106 is reset at the initial point of the symbol duration, so that the signal energy of one symbol does not interfere with that of another.

Figure 4:
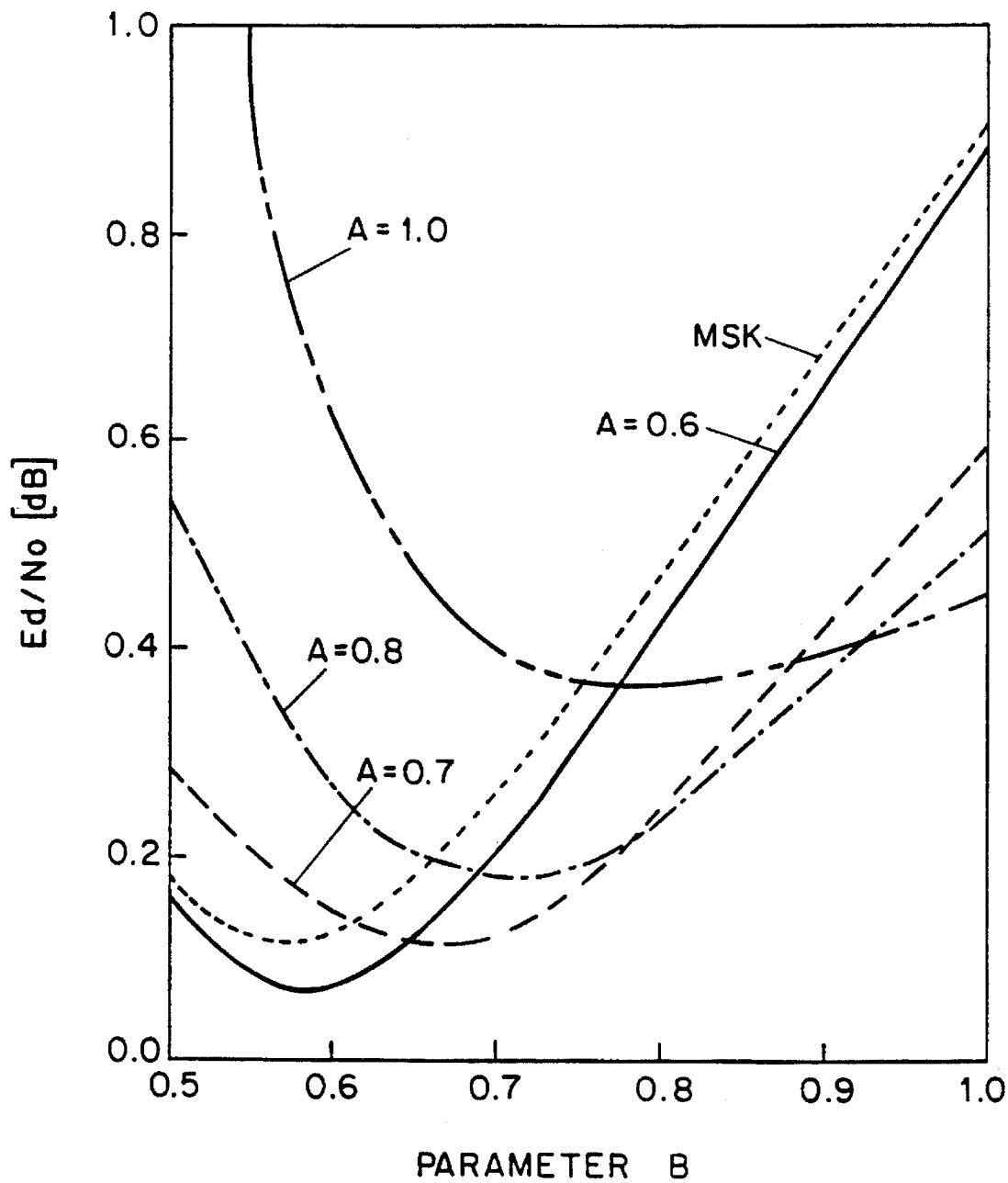
FIG. 4 is a graph for showing the degradation of the bit energy-to-noise density ratio with regard to the parameter [B] of the receiver in accordance with the amplitude parameter [A] of the transmitter.

FIG. 4 is a graph for showing the degradation of Eb/No with regard to the parameter B of the receiver in accordance with the amplitude parameter [A] of the transmitter. In particular, the parameter B is 0.6 and the amplitude parameter A is 0.6, which results in degradation of the bit energy-to-noise density ratio Eb/No by 0.1 dB or less in comparison with the optimum receiver, under the constraint of the probability of error $P_e$ being $1 \times 10E-4$. The parameter B being 0.6 and the amplitude parameter A being 1.0 results in a 0.7 dB degradation in the Eb/No ratio. In the previous case, letting the parameter B change to 0.8, determines a 0.35 dB degradation of the bit error-to-noise density ratio, provided that the amplitude parameter A of the superpose modulated signal is 1.0. Additionally, as shown FIG. 4, the receiver of the present invention with the parameter B being 0.6 can demodulate MSK signals with a negligible degradation in the probability of error.

Figure 5A:
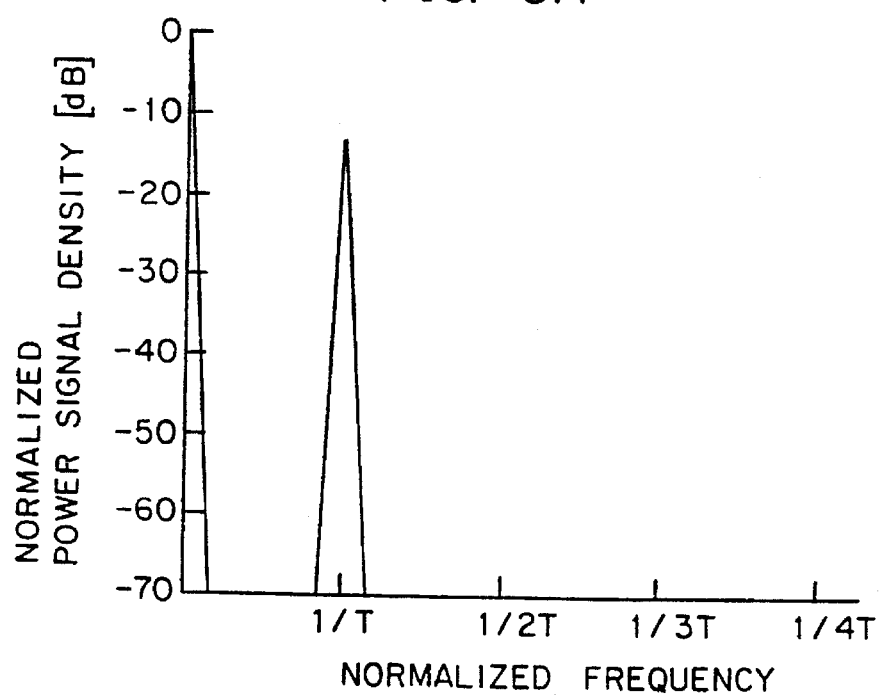
FIG. 5a is a graph for showing the normalized power spectrum density in accordance with the normalized frequency in the receiver according to the present invention.
Figure 5B:
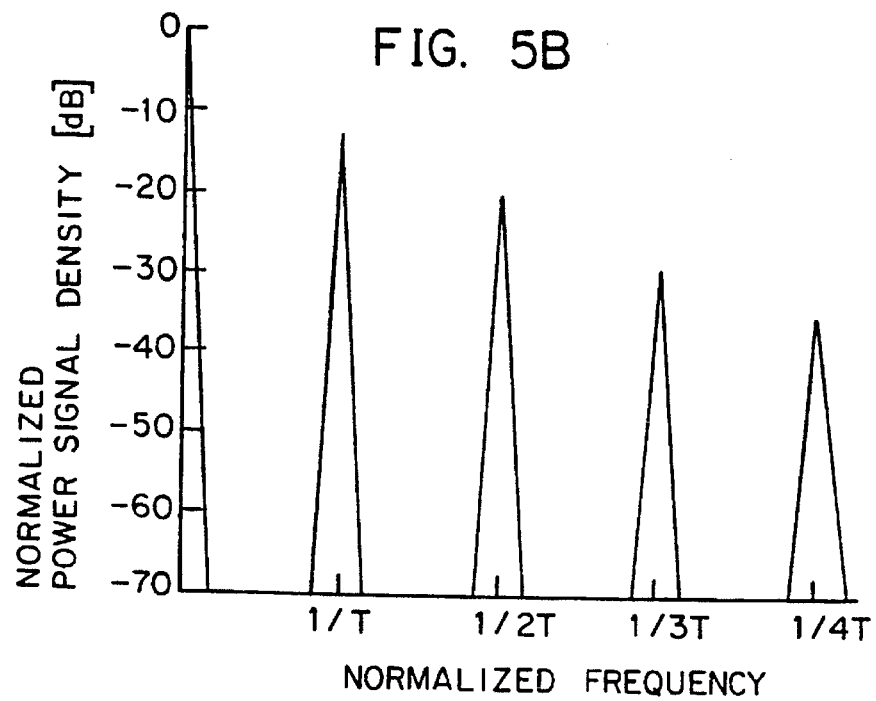
FIG. 5b is a graph for showing the normalized power spectrum density in accordance with the normalized frequency in the conventional optimum receiver for MSK signals.

FIG. 5a is a graph for showing the normalized power spectrum density in accordance with the normalized frequency in the receiver according to the present invention. FIG. 5b is a graph for showing the normalized power spectrum density in accordance with the normalized frequency in the conventional optimum receiver for MSK signal. As shown in FIG. 5a and FIG. 5b, the power spectrum density of the receiver according to this invention has a narrower bandwidth than that of the optimum receiver for MSK signals. That is to say, most superpose modulated signals have frequency components in the frequency bandwidth 1/T. Thus, for MSK signals, the receiver of this invention receives a lower noise component outside the original signal range than does the convention optimum receiver, resulting in a reduction of the adjacent channel interference.

Figure 6:
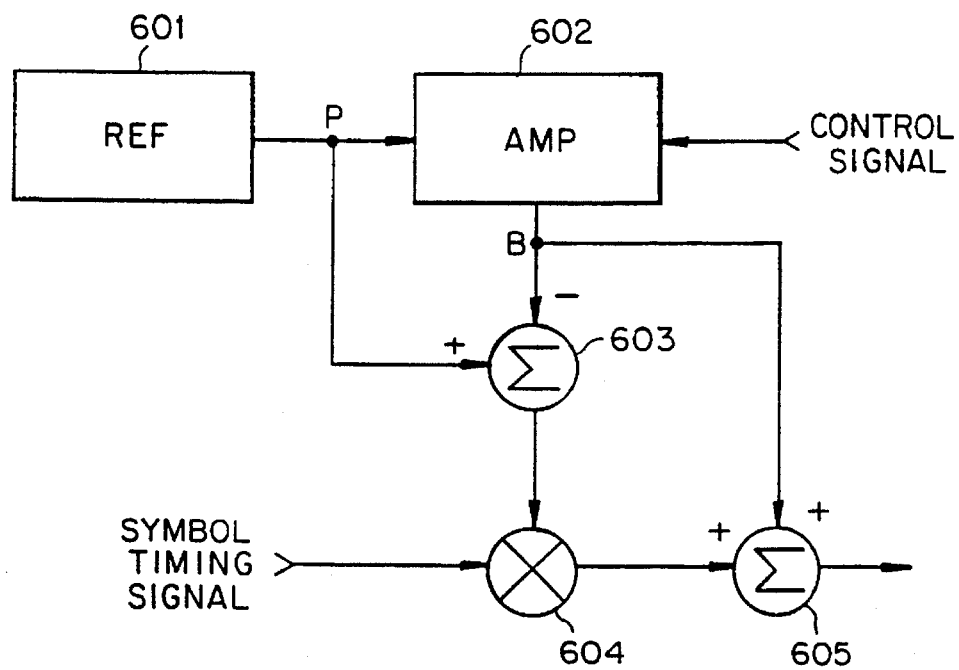
FIG. 6 is a detailed block diagram of the correlation signal generator shown in FIG. 1.

FIG. 6 is a detailed block diagram of the correlation signal generator shown in FIG. 1. The correlation signal generator includes a reference signal generator 601, an amplifier 602, a subtracter 603, a multiplier 604 and an adder 605. Reference signal generator 601 generates a reference signal whose level is P and supplies it to both amplifier 602 and subtracter 603. Amplifier 602 amplifies the reference signal P to produce a signal B, the gain thereof being less than unity and controlled by the control signal. Here, the control signal has been generated based on the characteristics of the transmission system, i.e., in accordance with the transmission system's designed operation. Subtracter 603 subtracts signal B from reference signal P.

Multiplier 604 receives the output of subtracter 603 and the symbol timing signal and multiplies the former by the latter to produce a basic correlation signal. Adder 605 receives the signal B and the basic correlation signal and adds the former to the latter to produce a correlation signal.

Figure 7:
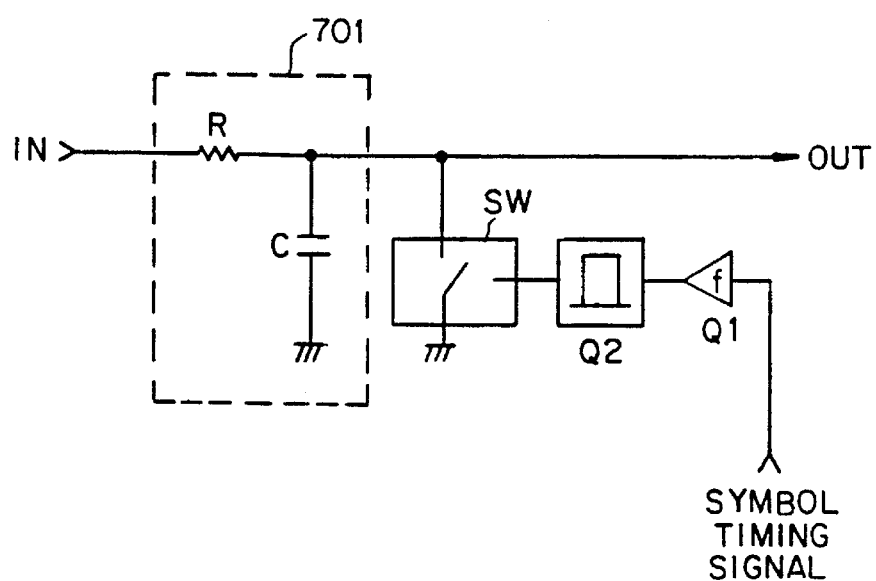
FIG. 7 is a detailed block diagram of the integrator shown in FIG. 1.

FIG. 7 is a detailed block diagram of the integrator shown in FIG. 1. Integrator includes a low-pass filter 701, a switch SW, a one-shot multivibrator Q2 and a converter Q1. Low-pass filter 701 includes a resistor R and a capacitor C.

Referring to FIG. 7, low-pass filter 701 receives the output of correlation multiplier 105 and performs low-pass-filtering thereto. Therefore, low-pass filter 701 integrates the output of correlation multiplier 105. Switch SW is periodically ON for very short durations, resulting in the output node of low-pass filter 701 being discharged. Here, switch SW may be a transistor connected between the output node of low-pass filter 701 and ground.

Converter Q1 transforms the sinusoidal form of the symbol timing signal into a square wave signal. One-shot multivibrator Q2 receives the square wave signal to produce a trigger signal, with the trigger signal being applied to switch SW as a switching control signal. In other words, switch SW performs switching in accordance with the trigger signal. The trigger signal is active at the beginning of each symbol period.

Figure 8:
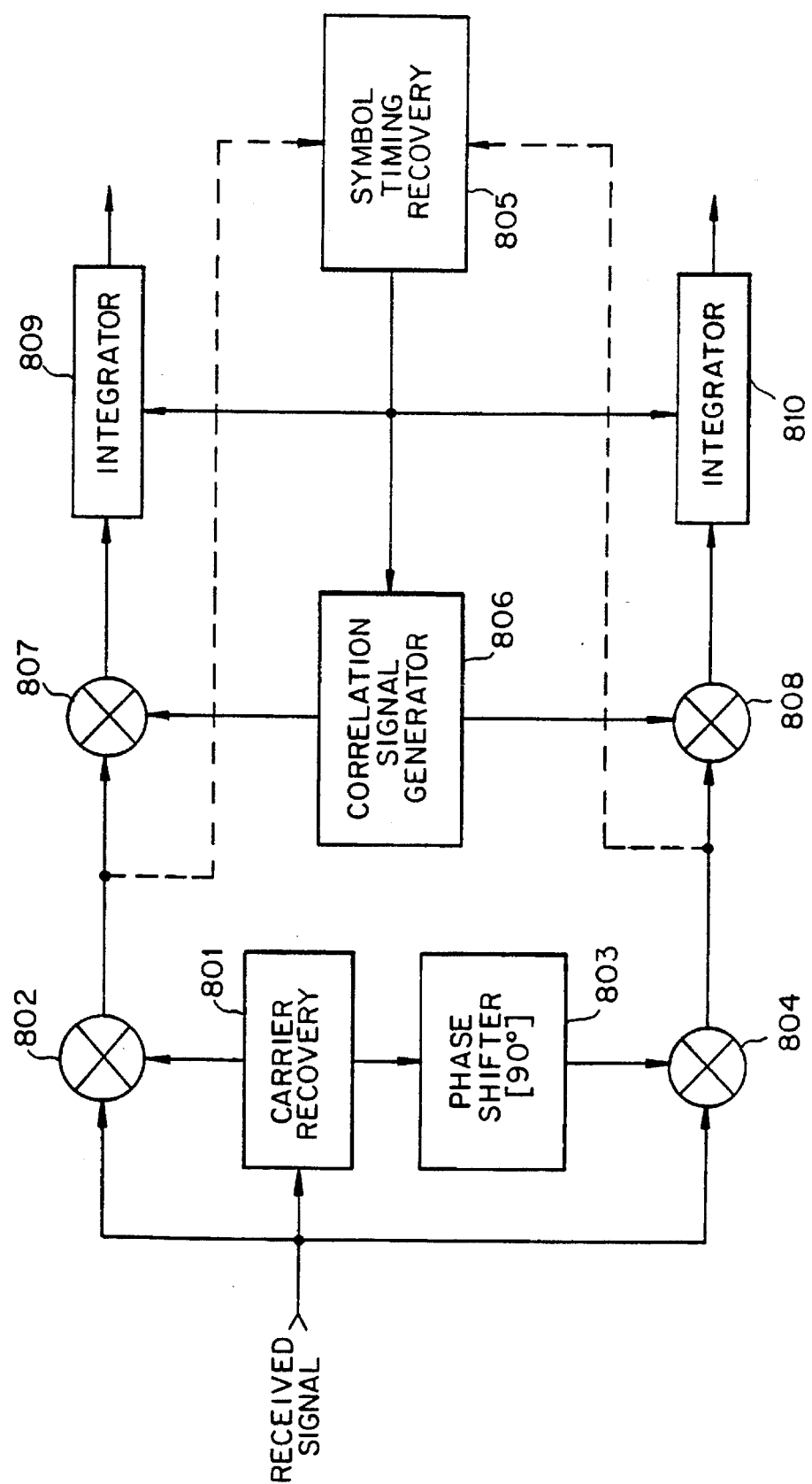
FIG. 8 is a schematic block diagram of the receiver for superpose quadrature modulated signal such as an MSK signal, according to the present invention.

FIG. 8 is a schematic block diagram of the receiver for a superpose quadrature modulated signal, such as an MSK signal, according to the present invention. This receiver includes a carrier recovery circuit 801, carrier multipliers 802 and 804, a phase shifter 803, correlation multipliers 807 and 808, a symbol timing recovery circuit 805, a correlation signal generator 806 and integrators 809 and 810.

The transmission channel for superpose quadrature modulated signals includes both an in-phase channel and a quadrature-phase channel, and theoretically has twice the bandwidth efficiency as a transmission channel having the in-phase channel only.

In FIG. 8, carrier recovery circuit 801 is similar to that shown in FIG. 1, producing an in-phase recovery carrier signal that is synchronized with that of corresponding transmitter. Phase shifter 803 receives the in-phase recovery carrier signal and performs phase-shifting by 90° to produce a quadrature-phase recovery carrier signal. Carrier multiplier 802 multiplies the received signal by the in-phase recovery carrier signal, and carrier multiplier 804 multiplies the received signal by the quadrature-phase recovery carrier signal. Symbol timing recovery 805 is similar to that shown FIG. 1, which receives one of the outputs of carrier multipliers 802 and 804. Correlation signal generator performs an operation on the symbol timing signal to produce a first correlation signal which is denoted as B+(P−B) cos($2\pi t/T$) and a second correlation signal which is denoted as B−(P−B) cos($2\pi t/T$). Correlation multiplier 807 multiplies the output of carrier multiplier 802 by the first correlation signal of B+(P−B) cos($2\pi t/T$), and correlation multiplier 808 multiplies the output of carrier multiplier 804 by the second correlation signal of B−(P−B) cos($2\pi t/T$). Integrators 809 and 810 are similar to that shown in FIG. 1, and can be implemented as described with reference to FIG. 7. Integrator 809 integrates the output of correlation multiplier 807 to produce an output which is reset at the initial point of every symbol period. Meanwhile, integrator 810 integrates the output of correlation multiplier 808 to produce an output which is also reset at the initial point of every symbol period.

Figure 9:
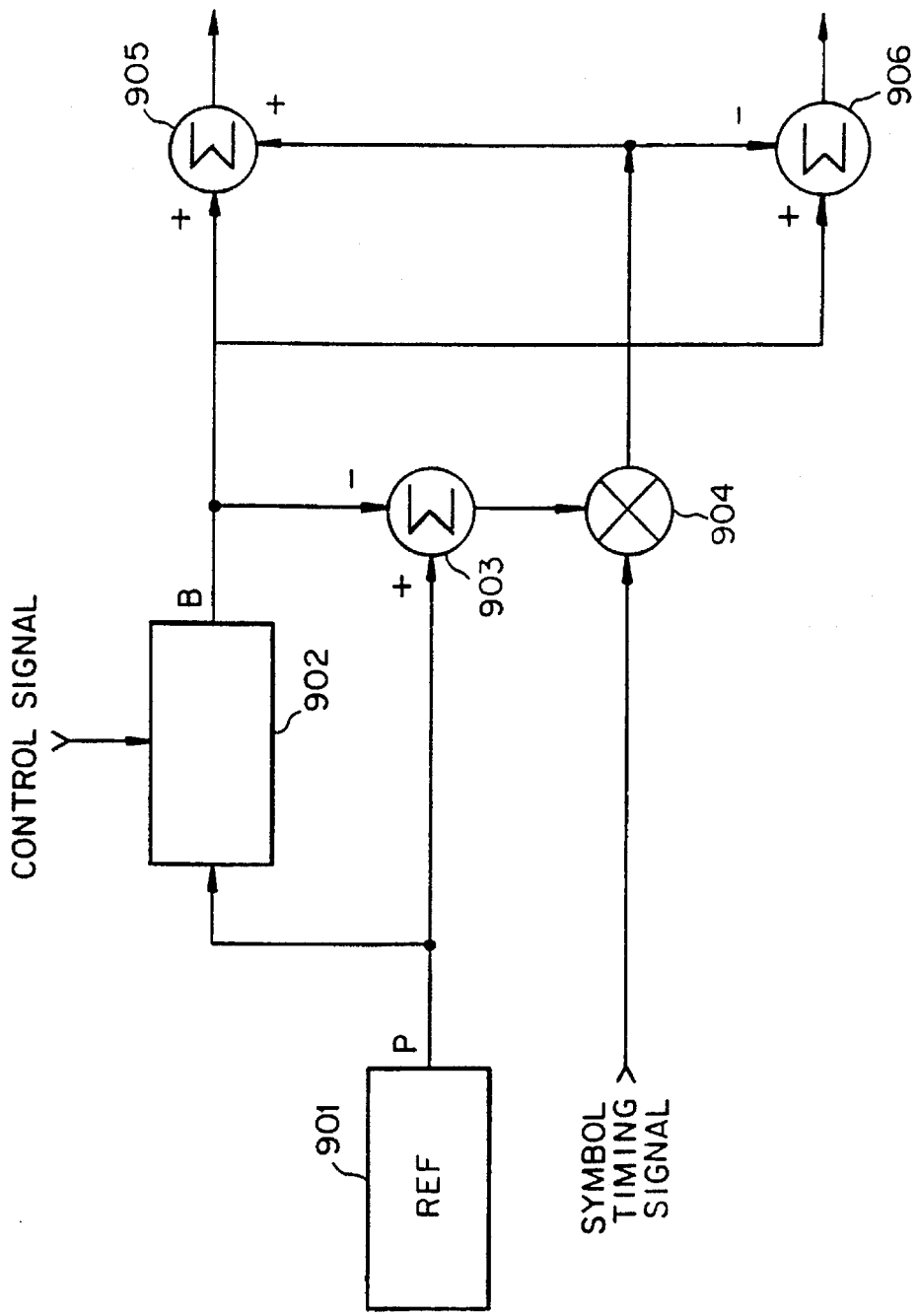
FIG. 9 is a detailed block diagram of the correlation signal generator shown in FIG. 8.

FIG. 9 is a detailed block diagram of the correlation signal generator shown in FIG. 8, and includes a reference signal generator 901, an amplifier 902, subtracters 903 and 906, a multiplier 904 and an adder 905. Here, reference signal generator 901, amplifier 902, subtracter 903, multiplier 904 and adder 905 are similar to the corresponding elements of FIG. 6. Subtracter 906 subtracts the basic correlation signal from the signal B to produce the second correlation signal of B−(P−B) cos($2\pi t/T$).

Figure 10:
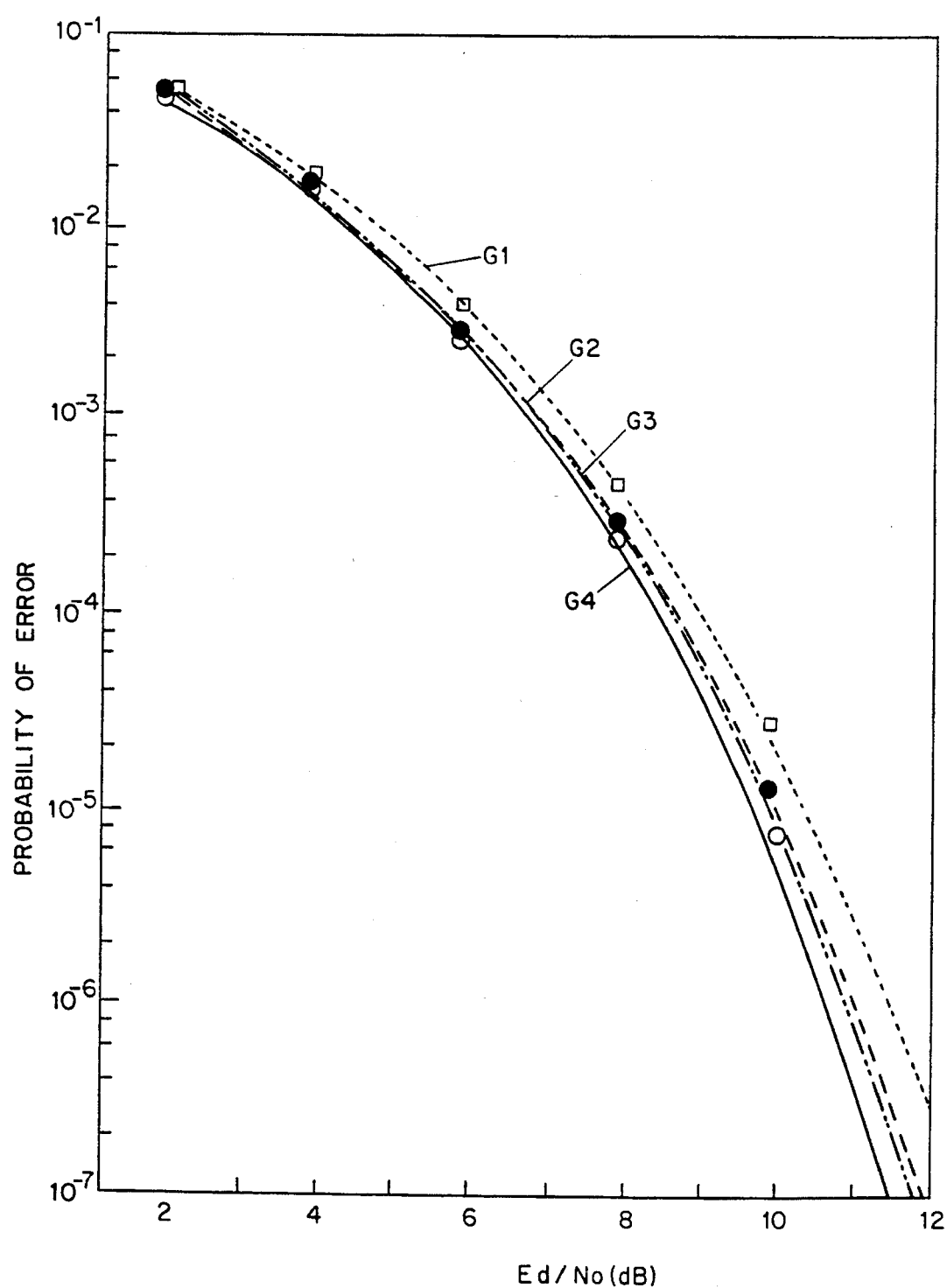
FIG. 10 is a graph for showing the probability of error with regard to the bit energy-to-noise density ratio in accordance with the amplitude parameter [A] and the parameter [B] of the receiver according to the present invention.

FIG. 10 is a graph for showing the probability of error with regard to the bit energy-to-noise density ratio Eb/No in accordance with the amplitude parameter [A] and the parameter [B] of the receiver according to the present invention. Referring to FIG. 10, the reference character G1 represents the degradation of the probability of error, provided that the receiver for a superpose quadrature modulated signal with an amplitude parameter of 1.0 has a parameter B of 0.8. The reference character G2 represents the degradation of the probability of error, provided that the receiver for a superpose quadrature modulated signal with an amplitude parameter of 0.8 has a parameter B of 0.7. The reference character G3 represents the degradation of the probability of error, provided that the receiver for a superpose quadrature modulated signal with an amplitude parameter of 0.6 has a parameter B of 0.6. The reference character G4 represents the degradation of the probability of error for the ideal Nyquist channel.

Referring to FIG. 10, it can be noted that a suitable parameter B for any amplitude parameter A should reduce the degradation of bit energy-to-noise density ratio Eb/No to 0.5 dB or less with the probability of error being 1×10E−4.

Figure 11:
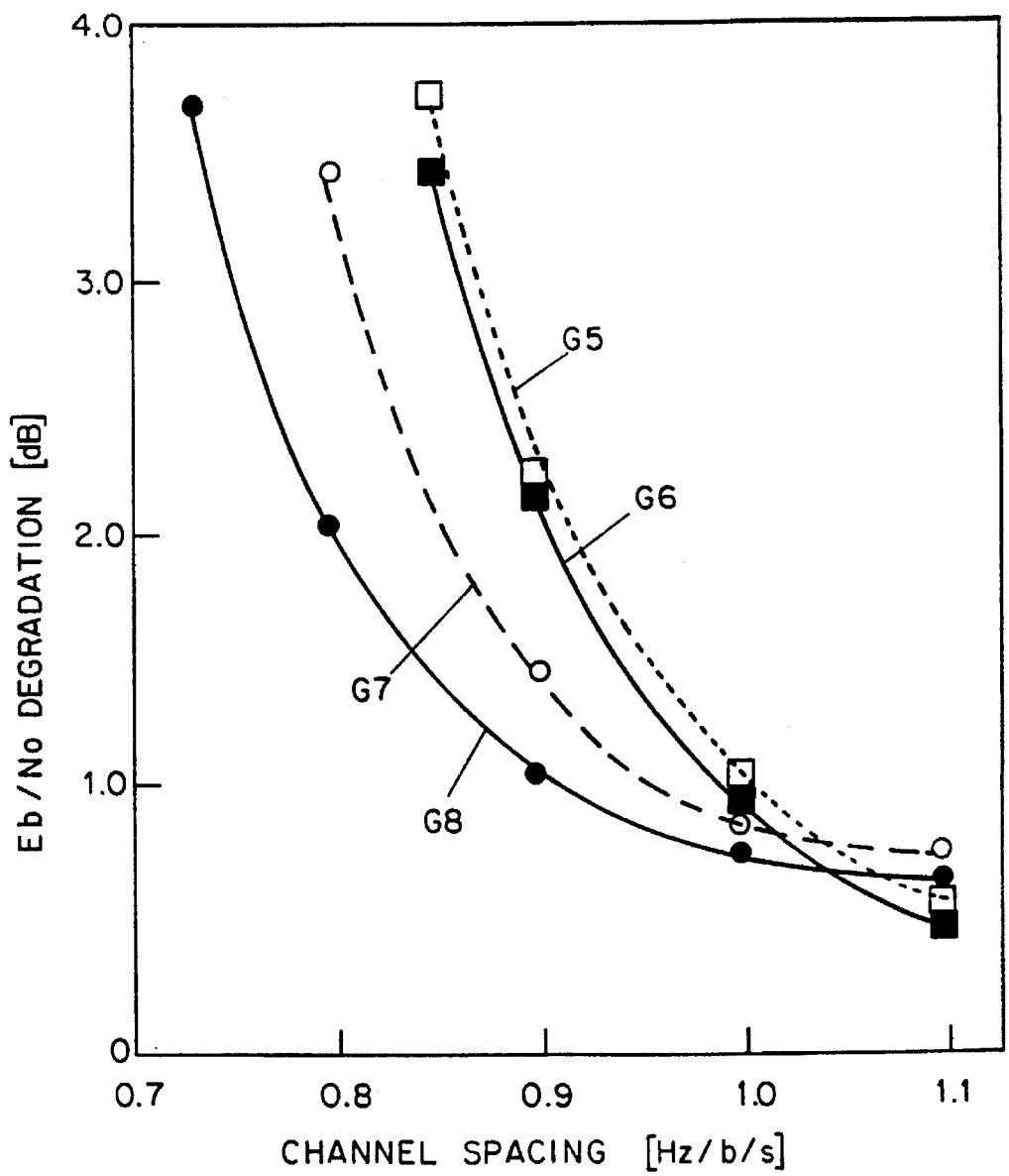
FIG. 11 is a graph for showing the degradation of the probability of error with regard to channel spacing.

FIG. 11 is a graph for showing the degradation of the probability of error with regard to channel spacing. Here, reference character G5 represents the optimum receiver for MSK signals, and reference character G6 represents the receiver of this invention with the parameter B being 0.6, provided that the transmitted signal is a superpose quadrature modulated signal with an amplitude parameter 0.6. Further, reference character G7 represents the optimum receiver for MSK signals, reference character G8 represents the receiver of this invention with the parameter B being 0.7, provided that the transmitted signal is a superpose quadrature modulated signal with an amplitude parameter 0.8. As shown, with the receiver of this invention compared with the conventional optimum receiver for MSK signals, the narrower the channel space is, the less the degradation of bit energy-to-noise density ratio Eb/No is. In other words, the receiver of this invention has a resistance to adjacent channel interference.

As descried above, this invention provides the receiver comprising a correlation signal generator for producing a correlation signal of B+ (P−B) cos($2\pi t/T$) or B−(P−B) cos($2\pi t/T$), so that the receiver can be implemented with simple hardware structure while maintaining a low probability of error. The receiver of this invention also has flexibility with respect to the amplitude parameter A and the symbol period (or symbol rate) of the transmitted signal, resulting from the period of the correlation signal being varied and the parameter B being varied in accordance with a control signal. In addition, the suitable parameter B makes the receiver of this invention operate as does the receiver for MSK signals. Finally, the receiver this invention reduces the adjacent channel interference.

What is claimed is:

1. A receiver of a superpose modulated signal comprising:

symbol timing recovery means for receiving the superpose modulated signal and extracting timing information therefrom to produce a symbol timing signal with being synchronized;

correlation signal generating means for generating a correlation signal as B+(P−B) cos($2\pi t/T$) based on said symbol timing signal, where B is a parameter to be adjustable, P is a predetermined maximum value and T refers to the symbol duration;

correlation multiplying means for multiplying the superpose modulated signal by said correlation signal; and means for integrating the output of said correlation multiplying means per each symbol period.

2. A receiver as claimed in claim 1, provided that the superpose modulated signal being transmitted on a carrier signal further comprises:

means for receiving the transmitted signal and extracting carrier information to produce a recovery carrier signal with being synchronized; and carrier multiplying means for multiplying the transmitted signal by the recovery carrier signal.

3. A receiver as claimed in claim 1, wherein said correlation signal generating means comprises:

means for generating a maximum value signal, the level thereof being P;

means for amplifying said maximum value signal and producing a parameter signal, the amplifying ratio being less than unity and operable;

means for subtracting said parameter signal from said maximum value signal to produce an amplitude signal;

means for multiplying said amplitude signal by said symbol timing signal to produce a basic correlation signal; and means for adding said parameter signal to said basic correlation signal to produce said correlation signal.

4. A receiver as claimed in claim 1, wherein said symbol timing recovery means produces a sinusoidal symbol timing signal.

5. A receiver as claimed in claim 1, wherein said means for integrating comprises:

means for transforming said symbol timing signal into a square wave signal whose period equals that of said symbol timing signal;

a one-shot multivibrator for receiving said square wave signal and producing a trigger signal whose period equals that of said square wave signal;

low-pass filter means for receiving and low-pass filtering the output of said correlation multiplying means; and switching means connected between the output of said low-pass filter means and ground, for switching in accordance with the trigger signal.

6. A receiver as claimed in claim 5, wherein said low-pass filter means comprises:

a resistor one of which is connected to the output of said correlation multiplying means; and a capacitor connected between the other end of the resistor and ground.

7. A receiver of superpose quadrature modulated signal being transmitted on a carrier signal comprising:

means for receiving the transmitted signal and extracting carrier information to produce an in-phase recovery carrier signal with being synchronized;

phase shifting means for phase-shifting on the in-phase recovery carrier signal to produce a quadrature-phase recovery carrier signal;

first carrier multiplying means for multiplying the superpose quadrature modulated signal by the in-phase recovery carrier signal to produce an in-phase superpose modulated recovery signal;

second carrier multiplying means for multiplying the superpose quadrature modulated signal by the quadrature-phase recovery carrier signal to produce a quadrature-phase superpose modulated recovery signal;

symbol timing recovery means for receiving one of said in-phase and quadrature-phase superpose modulated recovery signals and producing a symbol timing signal with being synchronized;

correlation signal generating means for receiving said symbol timing signal and generating a first correlation signal as $B+(P-B)\cos(2\pi t/T)$ and a second correlation signal as $B-(P-B)\cos(2\pi t/T)$, where B is a parameter to be adjustable, P is a predetermined maximum value and T refers to the symbol duration;

first correlation multiplying means for multiplying the in-phase superpose modulated recovery signal by the first correlation signal;

second correlation multiplying means for multiplying the quadrature-phase superpose modulated recovery signal by the second correlation signal;

first integrating means for integrating the output of the first correlation multiplying means per each symbol period; and second integrating means for integrating the output of the second correlation multiplying means per each symbol period.

8. A receiver as claimed in claim 7, wherein said correlation signal generating means comprises:

means for generating a maximum value signal, the level thereof being P;

means for amplifying said maximum value signal and producing a parameter signal, the amplifying ratio being less than unity and operable;

means for subtracting said parameter signal from said maximum value signal to produce a amplitude signal;

means for multiplying said amplitude signal by said symbol timing signal to produce a basic correlation signal;

means for adding said parameter signal to said basic correlation signal to produce the first correlation signal; and means for subtracting said basic correlation signal from the parameter signal to produce the second correlation signal.

9. A receiver as claimed in claim 7, wherein said symbol timing recovery means produces a sinusoidal symbol timing signal.

10. A receiver as claimed in claim 7, wherein said first integrating means comprises:

means for transforming said symbol timing signal into a square wave signal whose period equals that of said symbol timing signal;

a one-shot multivibrator for receiving said square wave signal and producing a trigger signal whose period equals that of said square wave signal;

low-pass filter means for receiving and low-pass filtering the output of said first correlation multiplying means; and switching means connected between the output of said low-pass filter means and ground, for switching in accordance with the trigger signal.

11. A receiver as claimed in claim 10, wherein said low-pass filter means comprises:

a resistor one end of which is connected to the output of said first correlation multiplying means; and a capacitor connected between the other end of the resistor and ground.

12. A receiver as claimed in claim 7, wherein said second integrating means comprises:

means for transforming said symbol timing signal into a square wave signal whose period equals that of said symbol timing signal;

a one-shot multivibrator for receiving said square wave signal and producing a trigger signal whose period equals that of said square wave signal;

low-pass filter means for receiving and low-pass filtering the output of said second correlation multiplying means; and switching means connected between the output of said low-pass filter means and ground, for switching in accordance with the trigger signal.

13. A receiver as claimed in claim 12, wherein said low-pass filter means comprises:

resistor one end of which is connected to the output of said second correlation multiplying means; and a capacitor connected between the other end of the resistor and ground.

\* \* \* \* \*